US012551994B2

(12) United States Patent
Teh et al.

(10) Patent No.: US 12,551,994 B2
(45) Date of Patent: Feb. 17, 2026

(54) IMPACT TOOL

(71) Applicant: Hilti Aktiengesellschaft, Schaan (LI)

(72) Inventors: Cheu Chyong Teh, Shanghai (CN); Quirin Wahle, Jengen (DE); Jim Chen, Shanghai (CN)

(73) Assignee: Hilti Aktiengesellschaft, Schaan (LI)

( * ) Notice: Subject to any disclaimer, the term of this patent is extended or adjusted under 35 U.S.C. 154(b) by 284 days.

(21) Appl. No.: 17/909,237

(22) PCT Filed: Mar. 1, 2021

(86) PCT No.: PCT/EP2021/054970

§ 371 (c)(1),
(2) Date: Sep. 2, 2022

(87) PCT Pub. No.: WO2021/180495

PCT Pub. Date: Sep. 16, 2021

(65) Prior Publication Data

US 2024/0198499 A1 Jun. 20, 2024

(30) Foreign Application Priority Data

Mar. 11, 2020 (CN) ........................ 202010165856.X

(51) Int. Cl.
*B25B 21/02* (2006.01)

(52) U.S. Cl.
CPC ................................. *B25B 21/023* (2013.01)

(58) Field of Classification Search
CPC ....... B25B 21/00; B25B 21/02; B25B 21/023; B25B 21/026; B25B 23/00;
(Continued)

(56) References Cited

U.S. PATENT DOCUMENTS 2,821,276 A * 1/1958 Reynolds ................ B25B 21/02
173/93.6
10,759,028 B2 9/2020 Funk et al.
(Continued)

FOREIGN PATENT DOCUMENTS

CN 1206647 A 2/1999
CN 102083593 A 6/2011
(Continued)

OTHER PUBLICATIONS

International Search Report of PCT/EP2021/054970 dated May 27, 2021.

*Primary Examiner* — Robert J Scruggs
(74) *Attorney, Agent, or Firm* — Davidson Kappel LLC

(57) ABSTRACT

An impact tool, including a casing, a drive disposed in the casing, a main shaft and a gear assembly connected to the drive, a hammer assembly connected to the gear assembly and main shaft, and an anvil, the main shaft defining a rotation axis around which the hammer assembly and anvil can rotate, the anvil having a head and a stem part, the stem part being substantially cylindrical, and at least one lug extending radially from that end of the stem part which is remote from the head, forming a bottom face substantially perpendicular to the rotation axis R; the anvil further includes a guide part extending axially from that end of the stem part which is remote from the head, and a front end of the main shaft is accommodated in the guide part.

13 Claims, 3 Drawing Sheets

(58) Field of Classification Search

CPC ............ B25B 23/0035; B25B 23/1475; B25D 17/005; B25D 17/06; B25D 2217/0015; B25F 5/001

See application file for complete search history.

(56) References Cited

U.S. PATENT DOCUMENTS

| | | | | |
|---|---|---|---|---|
| 2002/0094907 | A1* | 7/2002 | Elger | B25F 5/001 475/331 |
| 2009/0014193 | A1* | 1/2009 | Barezzani | B25B 21/026 173/93 |
| 2009/0223690 | A1 | 9/2009 | Sugimoto et al. | |
| 2011/0048751 | A1 | 3/2011 | Elger et al. | |
| 2011/0056714 | A1 | 3/2011 | Elger et al. | |
| 2014/0158388 | A1 | 6/2014 | Johnson et al. | |
| 2014/0262396 | A1 | 9/2014 | McClung et al. | |
| 2016/0121470 | A1 | 5/2016 | Mayer et al. | |
| 2017/0036327 | A1 | 2/2017 | Murakami et al. | |
| 2019/0247985 | A1* | 8/2019 | Xu | B25B 21/026 |

FOREIGN PATENT DOCUMENTS

| | | | | | |
|---|---|---|---|---|---|
| CN | 102083594 | A | | 6/2011 | |
| CN | 101163571 | B | | 8/2011 | |
| CN | 103862416 | A | | 6/2014 | |
| CN | 104044117 | A | | 9/2014 | |
| CN | 105082074 | | * | 11/2015 | |
| CN | 105082074 | A | | 11/2015 | |
| CN | 205968798 | U | | 2/2017 | |
| CN | 209125748 | U | | 7/2019 | |
| CN | 110125858 | A | | 8/2019 | |
| EP | 3124178 | A1 | | 2/2017 | |
| EP | 3505302 | A1 | | 7/2019 | |
| JP | 2004249422 | A | | 9/2004 | |
| WO | WO 9907521 | A1 | | 2/1999 | |
| WO | WO-2009137684 | A1 | * | 11/2009 | B25D 17/06 |
| WO | WO 2021104975 | A1 | | 6/2021 | |

* cited by examiner

IMPACT TOOL

FIELD OF THE INVENTION

The present invention relates to a power tool, in particular to an impact tool capable of rotating a striking force to perform jobs such as screw-thread fastening.

BACKGROUND

Impact power tools are already widely known. An impact wrench is an illustrative example of an impact tool, which can be used to install and remove threaded fasteners. Specifically, an impact tool, in particular an impact wrench, generally comprises a motor as a drive source, a gear speed reduction mechanism and main shaft which rotate as the motor performs a driving action, and a striking mechanism having a hammer body that engages with a main shaft cam; the striking mechanism is accommodated in a hammer body housing, such that the hammer body engages with an anvil shaft-supported at a front end of the hammer body housing. The main shaft and hammer are driven by the motor, and can convert rotation of the main shaft to an intermittent rotational striking force (impact) of the hammer body to act on the anvil, in order to provide rotation and striking to the anvil, thereby intermittently transmitting a rotational striking driving force to a top end tool, e.g., a socket or screwdriver head mounted on the anvil to perform tightening/removal of bolts and screws.

An anvil assembly of an existing impact tool is generally used to transmit torque from the motor to a tool element in order to perform work on a workpiece. In general, due to the striking rotational force, the anvil used in the anvil assembly is subjected to high stress levels. High stress levels might cause fatigue failure, with possible breakage, of the head of the anvil.

For example, the patent document CN 101163571B has disclosed an anvil; the anvil comprises an annular or tubular stem part, and at least one adjoining part extending radially therefrom, the adjoining part forming at least one adjoining surface. The hammer comprises at least one impact face, and is adapted to strike the adjoining surface by means of the impact face to provide a rotational pulse to the anvil.

SUMMARY OF THE INVENTION

In the patent just described, the adjoining part and tubular stem part of the anvil are flush with each other, i.e. a shoulder of a main shaft is aligned with the bottom of the impact face of the hammer once the main shaft has extended into the tubular stem part. Thus, the height of the impact face and the height of the adjoining surface restrict the length of extension of the main shaft into a hole of the tubular stem part. If the hole of the tubular stem part is too deep, the strength of the anvil will be affected; in particular, stress concentration is highly likely to occur at the boundary between the adjoining part and stem part, causing cracks and leading to failure of the anvil as a whole.

An object of the present invention is to provide an impact tool that is more compact while having higher durability.

The present invention provides an impact tool, comprising a casing, a driving force means disposed in the casing, a main shaft and a gear assembly connected to the driving force means, a hammer assembly connected to the gear assembly and main shaft, and an anvil, the main shaft defining a rotation axis around which the hammer assembly and anvil can rotate, the anvil having a head and a stem part, the stem part being substantially cylindrical, and at least one lug extending radially from that end of the stem part which is remote from the head, forming a bottom face substantially perpendicular to the rotation axis R; the anvil further comprises a guide part extending axially from that end of the stem part which is remote from the head, and a front end of the main shaft is accommodated in the guide part.

Preferably, in the direction of the rotation axis R, in the direction of the rotation axis R, the guide part extends axially beyond the bottom face of the lug.

According to a preferred embodiment of the present invention, the guide part is tubular; the outer diameter of the tube shape is substantially equal to or slightly smaller than the outer diameter of the stem part, and the inner diameter of the tube shape is substantially equal to the outer diameter of the main shaft front end. More preferably, a peripheral wall of the tube shape is continuous and of uniform thickness. Preferably, an inner hole of the tube shape extends into the stem part.

According to another preferred embodiment of the present invention, the anvil comprises two lugs arranged opposite one another radially with respect to the rotation axis R.

According to another preferred embodiment of the present invention, the anvil further comprises a reinforcing rib, which extends radially outwards from the stem part in a position adjoining that side of the lug which is close to the head; the radial extension gradually increases from a region near the stem part towards a region remote from the stem part, and a position of maximum radial extension of the reinforcing rib coincides with an outer edge of the lug.

According to a preferred embodiment of the present invention, the anvil is a single piece.

Preferably, the impact tool is an impact wrench.

The anvil of the present invention comprises a guide part which extends axially outwards beyond the bottom face of the lug at the stem part; consequently, the main shaft front end can extend longer into the anvil to achieve a better guiding function, without any need to increase the length of the anvil. The guide part is a tube shape having an inner hole extending to the stem part; thus, the main shaft front end can be suitably extended, with the extended main shaft front end being accommodated in the inner hole of the tube shape, and an extended wall of the tubular guide part surrounding the main shaft front end, avoiding anvil wear and failure caused by the hole for accommodating the main shaft front end being too deep in an existing anvil. Furthermore, the design of the present invention does not increase the overall length of a gearbox, so the length of the impact tool as a whole is more compact. The improved anvil having the guide part has a simple structure, and is easy to machine and fit; moreover, anvil reliability and durability are improved.

BRIEF DESCRIPTION OF THE FIGURES

The embodiments mentioned can be better understood through the following detailed description while perusing the drawings. It is emphasized that the various components are not necessarily drawn to scale. In fact, dimensions can be enlarged or reduced at will for the purposes of clear discussion. In the drawings, identical reference labels denote identical elements.

DETAILED DESCRIPTION

An impact tool and an anvil for the impact tool according to an embodiment of the present invention are described below with reference to FIGS. 1-5.

Figure 1:
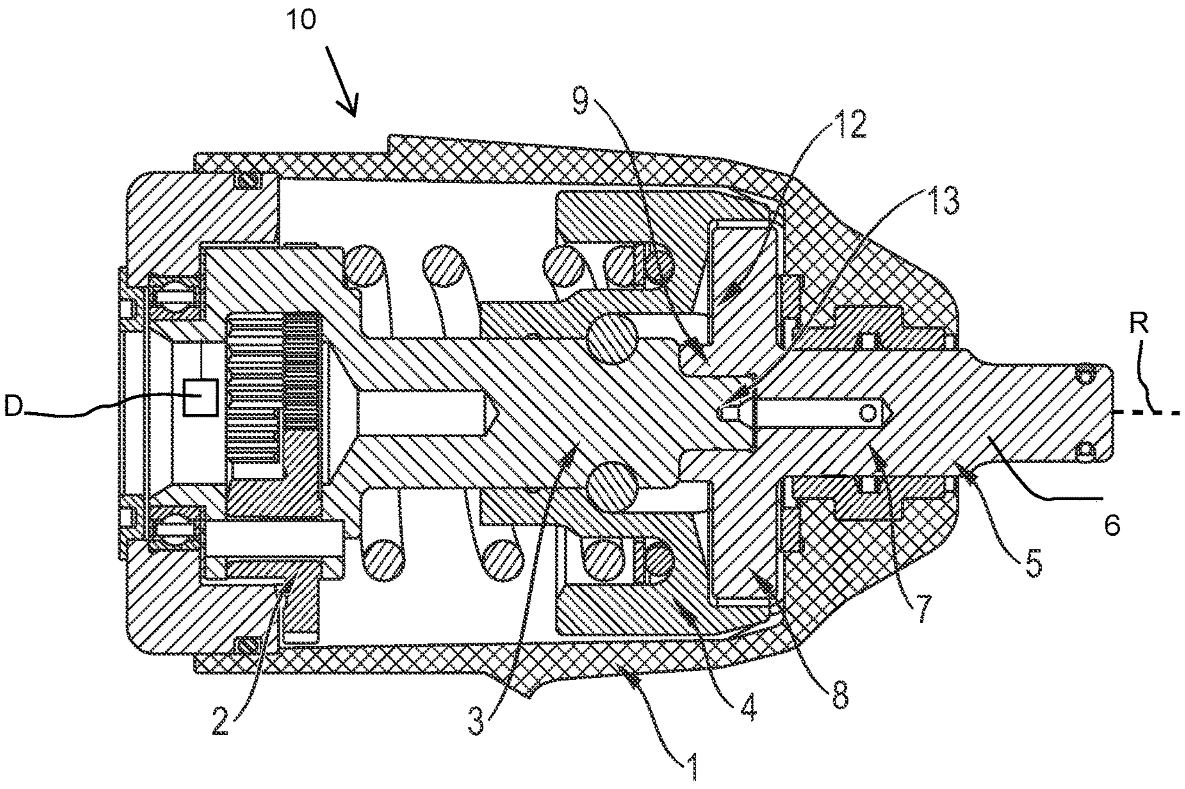
FIG. 1 is a schematic drawing of an impact mechanism of the impact tool of the present invention.

In a schematic embodiment of the present invention, the impact tool is an impact wrench. FIG. 1 shows a front end of an impact wrench. The impact tool of the present invention, in particular an impact wrench 10, comprises a casing 1, a driving force means (shown solely schematically as D) disposed in the casing, a main shaft 3 and a gear assembly 2 connected to the driving force means, a hammer assembly 4 connected to the gear assembly and main shaft, and an anvil 5 of the present invention. The driving force means D is preferably an electric motor, and is supplied with energy by a power source, such as a rechargeable battery or AC electricity. As an alternative solution, the driving force means may also be a pneumatic motor driven by compressed air or a hydraulic pipeline. Rotation of the driving force means is reduced in speed by the gear assembly 2, and then transmitted to the main shaft 3.

In the present invention, the gear assembly 2 is a planetary gear assembly. Preferably, the planetary gears are in two stages, i.e. with first-stage planetary gears and second-stage planetary gears being connected coaxially in a fixed manner. Specifically, the motor has a motor rotation shaft, a sun gear of the planetary gear assembly is driven to rotate by the motor rotation shaft, and first-stage star gears are meshed with the sun gear; second-stage planetary gears are fixed to the first-stage planetary gears, and the second-stage planetary gears rotate together with the first-stage planetary gears; an outer ring gear is meshed with the second-stage planetary gears. A rotational force is applied to the sun gear by the motor, then the rotational force is fully reduced in speed by the two-stage planetary gears and then transmitted to the main shaft 3. The dimensions of the planetary gear assembly can thereby be made more compact, such that the overall length of the impact wrench is also more compact.

The main shaft 3 then defines a rotation axis R; the hammer assembly 4 and anvil 5 can rotate around the rotation axis R. The main shaft 3 and the hammer assembly 4 respectively comprise a pair of opposite spiral grooves; a pair of rollers are accommodated in the spiral groove of the main shaft and the corresponding spiral groove of the hammer, thereby connecting the hammer assembly 4 to the main shaft 3. A spring element is disposed between a planetary gear carrier and the hammer, such that the hammer assembly 4 can rotate on the main shaft 3, and also drive the anvil 5 to rotate around the longitudinal rotation axis R. That end of the hammer assembly 4 which faces the anvil comprises a pair of protruding edges for striking and driving the anvil 5. The rotational force of the main shaft 3 is suitably converted to a rotational impact force by the hammer assembly 4; the rotational impact force drives the anvil 5 to rotate while experiencing the buffering action of the spring element mounted between the main shaft 3 and hammer assembly 4.

Figure 2:
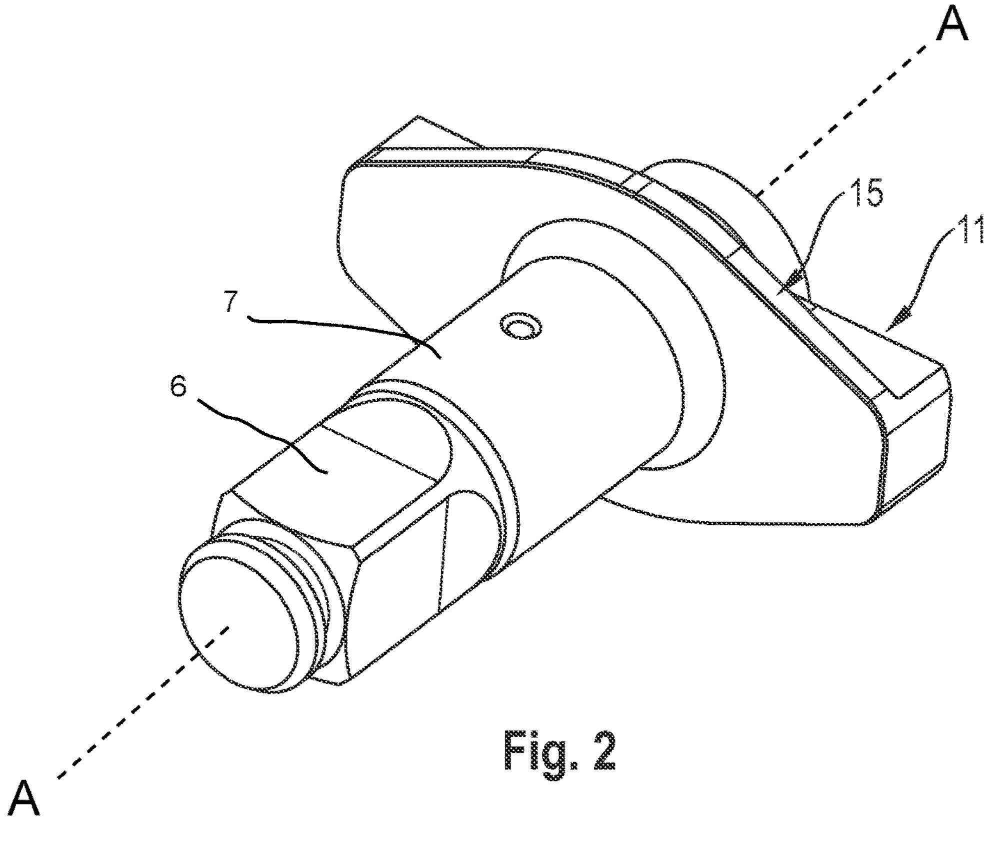
FIG. 2 shows a perspective view of the anvil for the impact tool according to the present invention.

As shown in FIGS. 2-5, the anvil 5 has a substantially cylindrical stem part 7 and a substantially square head 6 for transmitting torque. Referring to FIG. 2, as shown in a schematic embodiment of the present invention, the head 6 of the anvil comprises four substantially planar surfaces, with adjacent planar surfaces being oriented perpendicular to each other; these together form a substantially square part of the head, and are configured to accommodate a tool element. The substantially square head 6 transitions axially to the substantially cylindrical stem part 7. The stem part 7 extends axially from an extremity of the head, and is substantially cylindrical, with a cylinder center coinciding with the rotation axis R.

Figure 4:
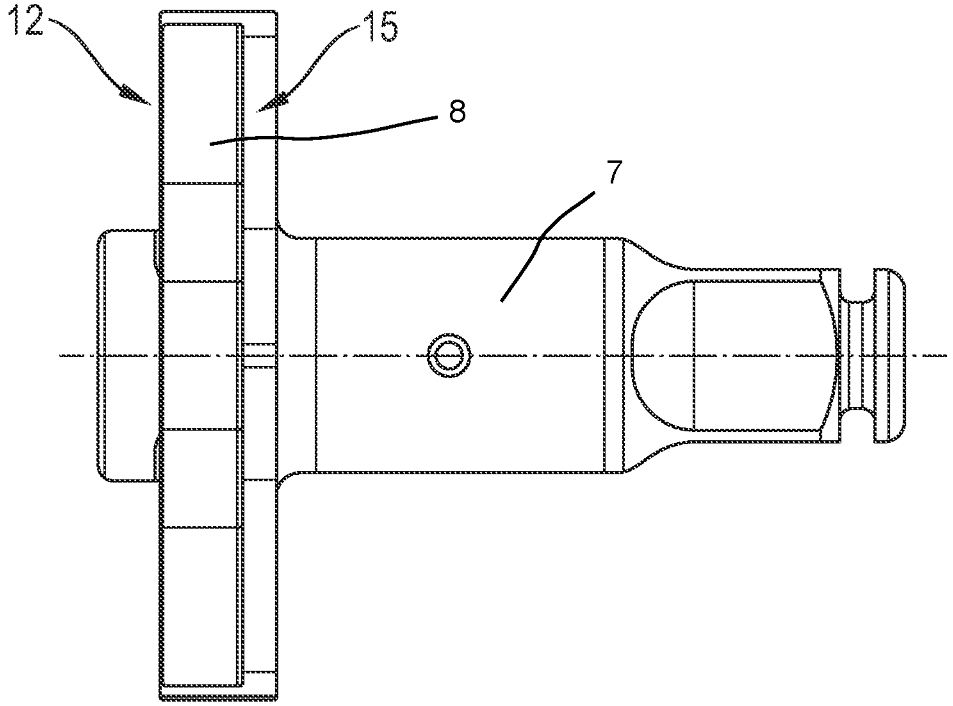
FIG. 4 is a top view of the anvil of the impact tool of the present invention shown in FIG. 2.
Figure 5:
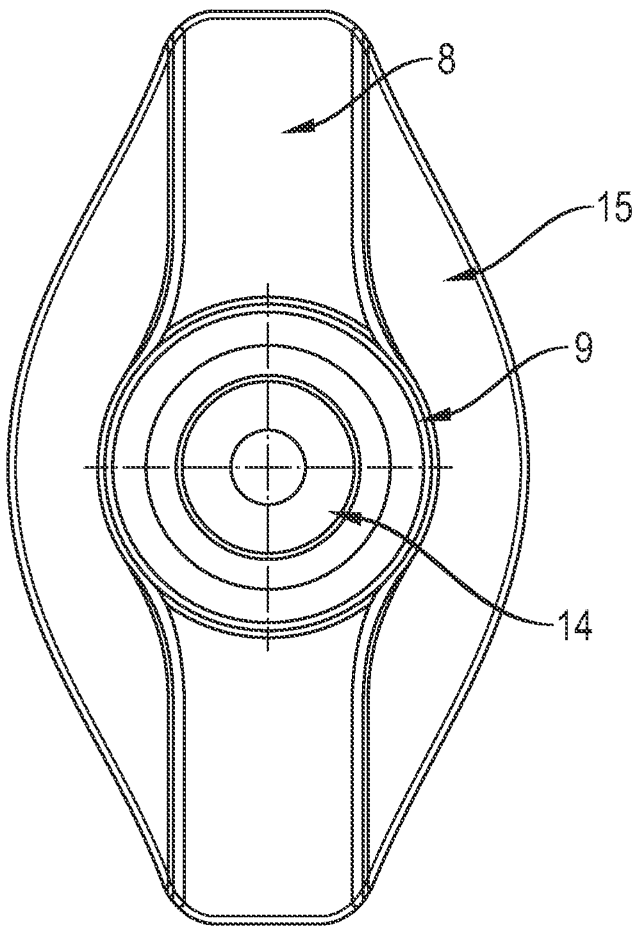
FIG. 5 is a front view of the anvil of the impact tool of the present invention shown in FIG. 2.

At least one lug 8 extends radially from that end of the stem part 7 which is remote from the head. As shown in FIGS. 1, 4 and 5, preferably, there are two lugs, arranged opposite one another radially with respect to the rotation axis R. The lugs 8 substantially extend radially outwards from the periphery of the stem part 7 in a gradually cut fashion, and form two opposite striking faces 11 (see e.g., FIGS. 2 and 5); preferably, the two opposite striking faces 11 are substantially parallel. The protruding edges of the hammer assembly 4 provide rotational pulses to the anvil 5 by striking the striking faces 11. Bottom faces 12 of the lugs 8 are substantially flat surfaces perpendicular to the rotation axis R. Thus, the height of the lugs 8 in the axial direction, i.e. the axial length of the striking faces 11, is substantially the same as the height of the protruding edges of the hammer assembly 4.

The anvil 5 further comprises a reinforcing rib 15 (see, e.g., FIG. 2), which extends radially outwards from the stem part 7 in a position adjoining the lug 8; the radial extension gradually increases from a region near the stem part towards a region remote from the stem part, and a position of maximum radial extension of the reinforcing rib 15 coincides with an outer edge of the lug 8. That is to say, the reinforcing rib 15 is arranged axially between the stem part 7 and the lug 8, and substantially takes the form of a flat, thin plate; preferably, the reinforcing rib 15 is a flat plate perpendicular to the rotation axis R. The reinforcing rib 15 can increase the limit strength and fatigue strength of the anvil, and reduce the polar inertia of the anvil.

The stem part 7 further comprises a guide part 9 extending axially away from the head 6; a front end 13 of the main shaft is accommodated in the guide part 9 (see, e.g., FIG. 1). In the direction of the rotation axis R, the guide part 9 extends axially beyond the bottom faces 12 of the lugs 8. In an existing anvil, the bottom faces 12 of the lugs are directly butt-joined to a shoulder of the main shaft front end 13, i.e. the main shaft front end 13 can only extend a very short distance into the anvil; otherwise, if the hole accommodating the main shaft front end 13 were too deep, the place where the lugs are connected to the stem part would be too thin and weak, and would be highly likely to experience stress concentration in the process of the anvil being struck, leading to cracking, or even damage and failure, of the anvil. Furthermore, the present invention may provide that the impact tool can have a smaller overall length and be more compact while having a higher power and higher torque. Due to the provision of the guide part extending axially beyond the lugs, the front end 13 of the main shaft 3 is accommodated deeper in the anvil without any increase in the length of the impact mechanism as a whole, such that the stable connection of the main shaft 3 and anvil 5 is guided and balanced more effectively, and wear to the anvil and main shaft is reduced, increasing the service lives of the anvil and impact tool.

Figure 3:
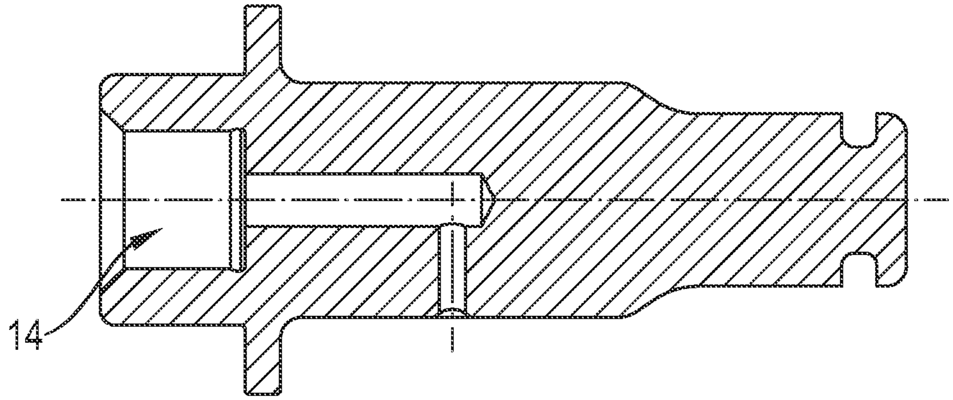
FIG. 3 is a sectional view of the anvil of the impact tool of the present invention shown in FIG. 2 taken along the line A-A of FIG. 2.

The guide part 9 is tubular; the outer diameter of the tube shape is substantially equal to or slightly smaller than the outer diameter of the stem part 7, and the inner diameter of the tube shape is substantially equal to the outer diameter of the main shaft front end 13; the main shaft 3 is accommodated in an inner hole 14 of the tubular guide part 9 in a slight clearance fit. Preferably, the inner hole 14 of the tube shape extends into the stem part. As shown in FIG. 3, it can be seen from the sectional view of the anvil 5 taken along line A-A of FIG. 2 that the depth of the inner hole 14 of the tubular guide part extends to the position of the anvil reinforcing ribs, and a better guiding effect is thereby achieved. As shown in FIGS. 4 and 5, the lug 8 adjoins that side of the reinforcing rib 15 which faces away from the stem part, and the guide part 9 extends away from the head, starting at that side of the reinforcing rib which faces away from the stem part; as can be seen, the lug 8 extends radially out from an outer diameter part of the guide part 9, with the lug 8 and the tubular part 9 partially coinciding with each other in the direction of the rotation axis R; this kind of anvil has better strength and a simple structure.

A peripheral wall of the tubular guide part 9 is continuous and of uniform thickness. Preferably, the wall thickness is as large as possible, to increase the wear resistance of the anvil and main shaft. According to an embodiment of the present invention, the wall thickness may be 3-5 mm, preferably 4 mm. The hole depth is chosen according to the sizes of the anvil lugs and main shaft front end, and may for example be 4-5 mm; preferably, the hole depth is 4.5 mm. Such dimensions are especially suited to the compact impact wrench of the present invention.

According to a preferred embodiment of the present invention, the anvil 5 is a single piece. The integrally formed anvil has a higher limit strength and a better torque transmission effect, while being easy to machine, manufacture and install. However, the anvil may also consist of separate pieces, e.g., the lug and stem part are separate, and fitted together by means of splines or a pin, etc.

In addition, the impact tool may also be a tool in which the motor is not of a brushless type, or a tool which uses an AC power supply instead of a battery pack, and the impact tool is not limited to an impact wrench; impact drivers, angle impact wrenches or angle impact drivers in which the anvil is arranged at right angles to the main shaft, etc., may also employ the present invention. For example, in an impact driver, in order to insert and mount a driver head, it is possible to configure 1 or 2 pins at a radial outer side of a mounting hole provided at the anvil axis.

As stated above, although exemplary embodiments of the present invention have already been explained herein with reference to the drawings, the present invention is not limited to the particular embodiments described above; many other embodiments are possible, and the scope of the present invention should be defined by the claims and their equivalent meaning.

The invention claimed is:

1. An impact tool comprising:
- a casing;
- a drive disposed in the casing;
- a main shaft and a gear assembly connected to the drive;
- a hammer assembly connected to the gear assembly and the main shaft; and
- an anvil, the main shaft defining a rotation axis, the hammer assembly and anvil rotatable around the rotation axis, the anvil having a head and a stem part, the stem part being cylindrical, and at least one lug extending radially from an end of the stem part remote from the head, the at least one lug forming a bottom face perpendicular to the rotation axis and facing the drive, the anvil further including a guide part with a maximum outer diameter smaller than a maximum outer diameter of the lug and extending axially from the end of the stem part remote from the head, a front end of the main shaft being accommodated in the guide part; wherein, in a direction of the rotation axis toward the drive, the guide part extends axially beyond the bottom face of the lug;
- wherein the anvil includes two separate lugs arranged opposite one another radially with respect to the rotation axis.

2. The impact tool as recited in claim 1 wherein the guide part is tubular.

3. The impact tool as recited in claim 2 wherein a peripheral wall of the guide part is continuous and of uniform thickness.

4. The impact tool as recited in claim 2 wherein an inner hole of the guide part extends into the stem part.

5. The impact tool as recited in claim 1 wherein the anvil further includes a reinforcing rib extends radially outwards from the stem part in a position adjoining at least one of the two lugs; the radial extension gradually increases from a region near the stem part towards a region remote from the stem part, and a position of maximum radial extension of the reinforcing rib coincides with an outer edge of the at least one lug.

6. The impact tool as recited in claim 5 wherein the reinforcing rib is arranged axially between the stem part and the two lugs.

7. The impact tool as recited in claim 5 wherein the reinforcing rib is a flat plate perpendicular to the rotation axis.

8. The impact tool as recited in claim 1 wherein the anvil is a single piece.

9. The impact tool as recited in claim 1 wherein the impact tool is an impact wrench.

10. The impact tool as recited in claim 1 wherein the two lugs extend radially outwards from a periphery of the stem part to each define two opposite parallel striking faces.

11. The impact tool as recited in claim 10 wherein protruding edges of the hammer assembly provide rotational pulses to the anvil by striking the striking faces.

12. The impact tool as recited in claim 1 wherein the front end is accommodated in the guide part to extend axially past the bottom face.

13. An impact tool comprising:
- a casing;
- a drive disposed in the casing;
- a main shaft and a gear assembly connected to the drive;
- a hammer assembly connected to the gear assembly and the main shaft; and
- an anvil, the main shaft defining a rotation axis, the hammer assembly and anvil rotatable around the rotation axis, the anvil having a head and a stem part, the stem part being cylindrical, and at least one lug extending radially from an end of the stem part remote from the head, the at least one lug forming a bottom face perpendicular to the rotation axis and facing the drive, the anvil further including a guide part with a maximum outer diameter smaller than a maximum outer diameter of the lug and extending axially from the end of the stem part remote from the head, a front end of the main shaft being accommodated in the guide part; wherein, in a direction of the rotation axis toward the drive, the guide part extends axially beyond the bottom face of the lug;

wherein the anvil includes two separate lugs arranged opposite one another radially with respect to the rotation axis and wherein the front end is accommodated in the guide part to extend axially past the bottom face.

* * * * *